(12) United States Patent
Ananthapur Bache et al.

(10) Patent No.: US 10,606,738 B2
(45) Date of Patent: *Mar. 31, 2020

(54) APPLICATION TESTING ON A BLOCKCHAIN

(71) Applicant: International Business Machines Corporation, Armonk, NY (US)

(72) Inventors: Vijay Kumar Ananthapur Bache, Bangalore (IN); Jhilam Bera, Bangalore (IN); Arvind Kumar, Bangalore (IN); Bidhu Sahoo, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/888,376

(22) Filed: Feb. 5, 2018

(65) Prior Publication Data

US 2018/0157583 A1    Jun. 7, 2018

Related U.S. Application Data

(63) Continuation of application No. 15/371,812, filed on Dec. 7, 2016, now Pat. No. 9,934,138.

(51) Int. Cl.
*G06F 9/44* (2018.01)
*G06F 11/36* (2006.01)
*H04L 9/32* (2006.01)

(52) U.S. Cl.
CPC ...... *G06F 11/3688* (2013.01); *G06F 11/3676* (2013.01); *H04L 9/3236* (2013.01); *H04L 2209/38* (2013.01); *H04L 2209/56* (2013.01)

(58) Field of Classification Search
CPC .................................................. G06F 11/3688
USPC .......................................................... 717/124
See application file for complete search history.

(56) References Cited

U.S. PATENT DOCUMENTS

| | | | |
|---|---|---|---|
| 6,931,532 B1 * | 8/2005 | Davis | G06F 21/6209 380/273 |
| 6,941,459 B1 * | 9/2005 | Hind | G06F 17/227 380/273 |
| 6,961,849 B1 | 11/2005 | Davis et al. | |
| 6,978,367 B1 * | 12/2005 | Hind | G06F 21/577 380/273 |
| 7,823,138 B2 | 10/2010 | Arguelles et al. | |
| 7,913,137 B2 * | 3/2011 | Mukherjee | G01R 31/31854 714/729 |
| 8,332,201 B1 * | 12/2012 | Briggs | G06F 17/5045 703/15 |
| 9,015,847 B1 | 4/2015 | Kaplan et al. | |
| 9,223,553 B2 * | 12/2015 | Venkatasubramanian | G06F 11/0751 |
| 9,569,771 B2 | 2/2017 | Lesavich et al. | |

(Continued)

OTHER PUBLICATIONS

Noyes, Charles, "BitAV: Fast Anit-Malware by Distributed Blockchain Consensus and Feedforward Scanning," arXiv preprint, arXiv:1601.01405, arXiv.org, Jan. 7, 2016.

*Primary Examiner* — Evral E Bodden

(57) ABSTRACT

A blockchain test configuration may provide a simple and secure infrastructure for testing applications. One example method of operation may comprise one or more of transmitting a request to a network of nodes to test a test package associated with an application. The method may also include receiving results based on the test of the test package and recording the results in a blockchain.

20 Claims, 5 Drawing Sheets

(56) References Cited

U.S. PATENT DOCUMENTS

| | | |
|---|---|---|
| 9,778,316 B2 * | 10/2017 | Rajski .............. G01R 31/31854 |
| 9,807,106 B2 | 10/2017 | Daniel et al. |
| 2015/0128279 A1 | 5/2015 | Becker et al. |
| 2015/0332283 A1 * | 11/2015 | Witchey ............... G06Q 30/018 705/3 |
| 2016/0218879 A1 | 7/2016 | Ferrin |

* cited by examiner

350

APPLICATION TESTING ON A BLOCKCHAIN

TECHNICAL FIELD

This application relates to testing software applications and more specifically to testing software applications on a blockchain.

BACKGROUND

Software automation testing has become more hardware intensive as the complexity and requirements of new software applications continues to increase. With the current best practices of implemented continuous integration (CI) and continuous testing (CT), regular builds and automation test-cases are increasingly important. To run automation test cases at a needed frequency requires a large hardware pool of resources which can exponentially increase as the test cases and number of applications increase. Currently, there are cloud-based test infrastructures that are available to provide the required elasticity, however, these options tend to be costly and resource intensive solutions.

SUMMARY

One example embodiment may include a method that comprises a blockchain test configuration that may provide a simple and secure infrastructure for testing applications. One example method of operation may comprise one or more of transmitting a request to a network of nodes to test a test package associated with an application. The method may also include receiving results based on the test of the test package, and recording the results in a blockchain.

Another example embodiment may include an apparatus that comprises one or more of a transmitter configured to transmit a request to a network of nodes to test a test package associated with an application, a receiver configured to receive results based on the test of the test package, and a processor configured to record the results in a blockchain.

Still another example embodiment may include a non-transitory computer readable storage medium configured to store instructions that when executed causes a processor to perform one or more of: transmitting a request to a network of nodes to test a test package associated with an application, receiving results based on the test of the test package, and recording the results in a blockchain.

DETAILED DESCRIPTION

Figure 1:
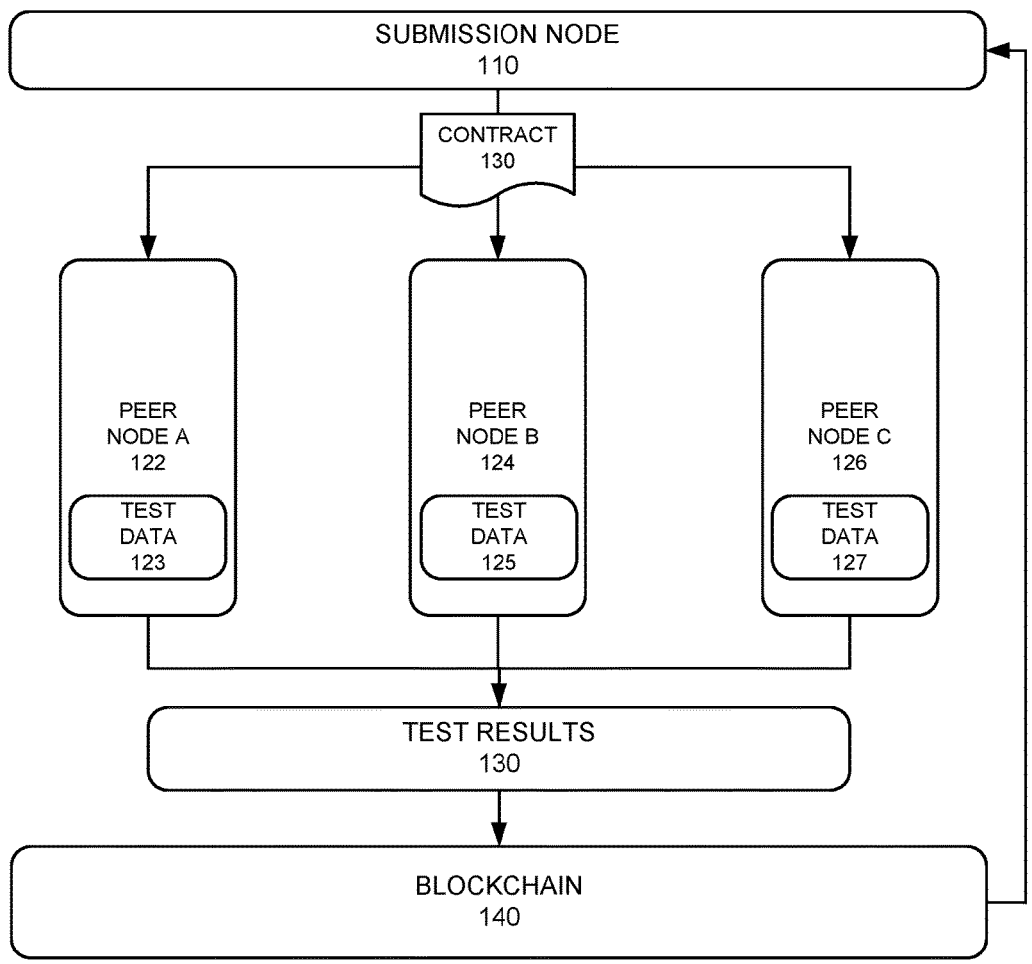
FIG. 1 illustrates a logic block diagram of a test package blockchain configuration according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Software and related application automation testing requires varying hardware platforms (e.g., personal computers, laptops, mobile devices, operating systems, etc.) in large numbers as well as specific software/operating system versions. Furthermore, the testing should be performed in practical environments of different third party applications and test systems, which may not be possible in a simulated lab environment. Also, distributed peer nodes and protocols may not be available to execute the automated test cases and highly frequent changes in the application require frequent automated test case execution (for example, every 5-10 minutes).

One approach is to utilize a distributed peer proxy protocol mechanism (DPPP) which can be required for test task creation, distribution and execution. The DPP protocol may include a centrally distributed peer proxy node server (DP-PNS) which communicates to multiple DPPN clients or DPPNC. A DPPNS is a command and control server which issues command to multiple DPPNCs which support a DPPNS mode of operation. The DPPNS is also capable of storing automated test results and communicating with an organization's production server and build systems. The DPPNS may compare the results of a production server/build verification server with testing results received from a DPPNC, flag the possible areas of issues to the organization and even create a 'fake' issue to simulate an actual environment. The DPP protocols permit any organization to participate as a DPPNS and DPPC. Ensuring the test cases are run completely may be performed by a smart contract which ensures test case operations. By running multiple test cases on multiple iterations, especially performance tests, the correct node in a peer-to-peer (P2P) node network should be running the test cases according to the contact requirements (e.g., CPU size, memory size, etc.).

In operation, when creating a test container package or just "package", the application/project may need to be stored for third party access purposes. This application and project will be publicly accessible to any P2P network. In the user container package, information of a proper test environment will also be available along with reward, requirements, expectations, etc. For example, the information can include a platform, GPU, CPU, RAM clock speed, number of cycles needed, time required, a minimum amount of testing required to receive the reward, etc. Also, information regarding test cases with valid and invalid data will be available in the test package. The information about the testing can be published to an entire P2P network in a ledger. Distribution of the entire testing task may be divided into peers which are available and eligible for testing as potential 'miners'. After completing an assigned task to one or more miners and/or receiving confirmations of the miners that accepted the test project, a project test report may be updated to all users in the P2P network with the blockchain infrastructure to share the amount of testing performed and any other results.

A runtime may be packaged as a container and distributed over a P2P network, such as a torrent. Distributed tasks among miners can vary with respect to processing ability of an individual miner processor. Among the miners, a crypto-currency (such as BITCOIN) can be shared with respect to completion of an assigned task. A submission node may submit requests for test execution. A submission may be performed with a contract document (i.e., smart contract) that provides all the information that is required to execute the test cases and the reward. The test runtime can also be packaged as a container. There are times where test cases need to be implemented in a specific environment and a particular operating system. In those situations, apart from providing the test cases, the complete runtime can be packaged as a container or a virtual machine and communicated over the P2P network using a communication protocol. The test packages are shared as a list of test cases or complete runtimes. The test acceptance criteria and test completeness can be captured while the test cases are executed. This is verified and validated using an algorithm, for example a consensus algorithm, before the transaction is posted on the blockchain. The nodes are selected based on the contract, which specifies the basic requirements for running the test cases. The test cases are distributed and sent to P2P nodes. Based on the contract, the nodes execute the test cases and send back the results. The master node, which submitted the request, would consolidate the test case execution, validation and verification, based on standard test completeness, and then will post the prorated transactions on the blockchain (via, for example, a crypto-currency).

FIG. 1 illustrates a logic block diagram of a test package blockchain configuration according to example embodiments. Referring to FIG. 1, the network and/or system 100 used to perform the testing may include the submission node 110 (i.e., master, server, administrator), which a package is transmitted through the P2P network as a blockchain. Miners may receive an invite, request or other notification to retrieve and process the test package. The package may then be accessed and executed to initiate one or more test cases based on the contract that is provided in the package. The test results, when completed, are shared with the submission entity and transmitted through the P2P network. A blockchain records the transaction on the ledger and crypto-currency promised as per the contract is pro-rated based on a number of test cycles executed by one or more of the miners. Once the package is created, it may be shared as a contract 130 or the contract may be embedded as part of a larger package. The information in the contract 130 can be sent directly to any of the nodes 122, 124, 126 (and to other nodes not depicted) in the P2P network, which may accept part of, or the entire, test package requirements and stored test data 123, 125, 127, respectively, to perform the testing. Thereafter, the test results are shared 130 with the submission node 110, and may be written to the blockchain 140.

The contract (i.e., package) may include the application/app/process that needs to be tested and may be packaged into a container or other container technology image. The image can also include automation test cases, rules which define what kind of infrastructure on which this process should be executed (e.g., CPU, RAM, Clock speed, GPU, etc.). Additional contract information may include "# of crypto-currency units, etc.) that the executors/miners/peers will earn when they execute the test cases. The test package may be stored in the P2P blockchain network. The peers can subscribe to the pool, which receives the work package and begins executing the work package container. On completion of the execution, the test results are submitted back to the network for the requester to consume and/or share with other interested parties. The package, results, and other information may be stored in the blockchain. The crypto-currency promised by the contract may be transferred based on proration rules, for example, if a test requires a certain number of cycles to be completed, such as 100,000 cycles, and a miner peer device performs a certain number of those cycles, for example 10%, the account associated with that device may receive 10% of the total available crypto-currency for the work effort.

Figure 2:
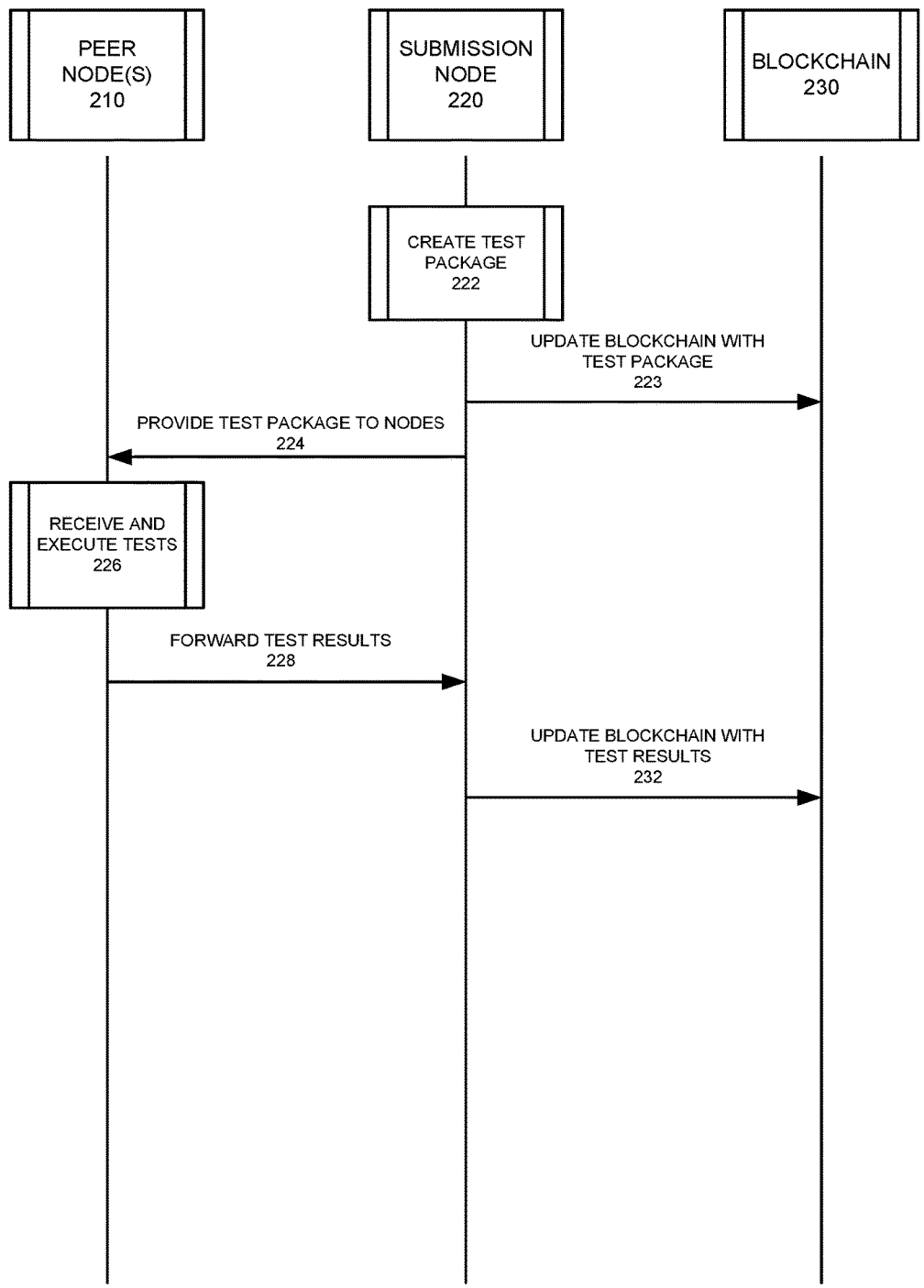
FIG. 2 illustrates a system signaling diagram of a test package blockchain configuration according to example embodiments.

FIG. 2 illustrates a system signaling diagram of a test package blockchain configuration according to example embodiments. Referring to FIG. 2, the configuration 200 includes one or more peer nodes 210, a submission node (server) 220 and/or a blockchain 230. In operation, a test package 222 may be created based on testing requirements. The blockchain 230 may be updated to reflect the test package 223, which is accessible to certain peer nodes 210. The act of writing the test package to the blockchain may cause an alert or request to be sent to the peer nodes. The nodes which are used to execute the test package 226 may perform some or all of the testing and create a report or other file which may also be sent 228 to the submission node 220 and updated 232 in the blockchain 230. In an embodiment, the blockchain can be hosted on the peer node(s) 210 and/or the node 220.

Figure 3A:
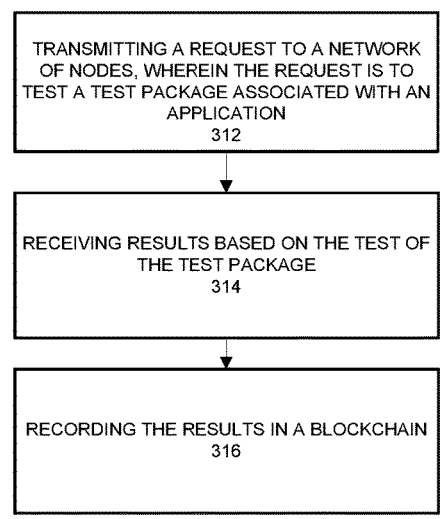
FIG. 3A illustrates a flow diagram of an example method of operation according to example embodiments.

FIG. 3A illustrates a flow diagram of an example method of operation according to example embodiments. Referring to FIG. 3A, the flow 300 comprises one or more of transmitting a request to a network of nodes, and the request is to test a test package associated with an application 312 and receiving results based on the test of the test package 314 and recording the results in a blockchain 316. The method may also include creating a contract that includes test information used to perform the test and including the contract and the request in the test package. The contract may include one or more of a reward for performing the test, a number of test cycles, an amount of central processing unit utilization, an amount of memory utilization and an amount of time. The test package may be an image container or other type of software container package. Also, transmitting the request can include using a distributed peer proxy node server to distribute the test package to a plurality of distributed peer proxy node client devices operating as the network of nodes. The method may also include comparing the received results to known results associated with the application, and creating an alert when the results are different from the known results and broadcasting the results to one or more client devices in the network.

Figure 3B:
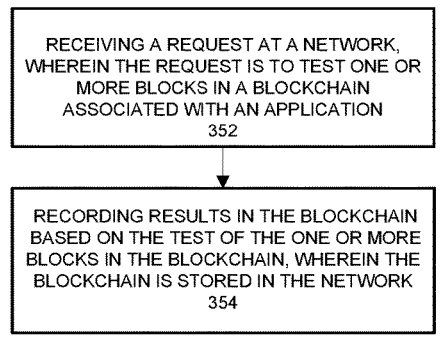
FIG. 3B illustrates a flow diagram of an example method of operation according to example embodiments.

FIG. 3B illustrates a flow diagram of an example method of operation according to example embodiments. The method 350 comprises one or more of receiving a request at a network, the request to test one or more blocks in a blockchain associated with an application 352, and recording results in the blockchain based on the test of the one or more blocks in the blockchain, wherein the blockchain is stored in the network 354. Testing a block of a blockchain may be necessary to ensure integrity and accuracy. Testing may be performed at a per block level. The peers can identify blocks which require testing based on an established contract. The block may be tested for various purposes and may be done so even after the hash has been calculated and written (block completion).

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 4 illustrates an example network element 400, which may represent or be integrated in any of the above-described components, etc.

Figure 4:
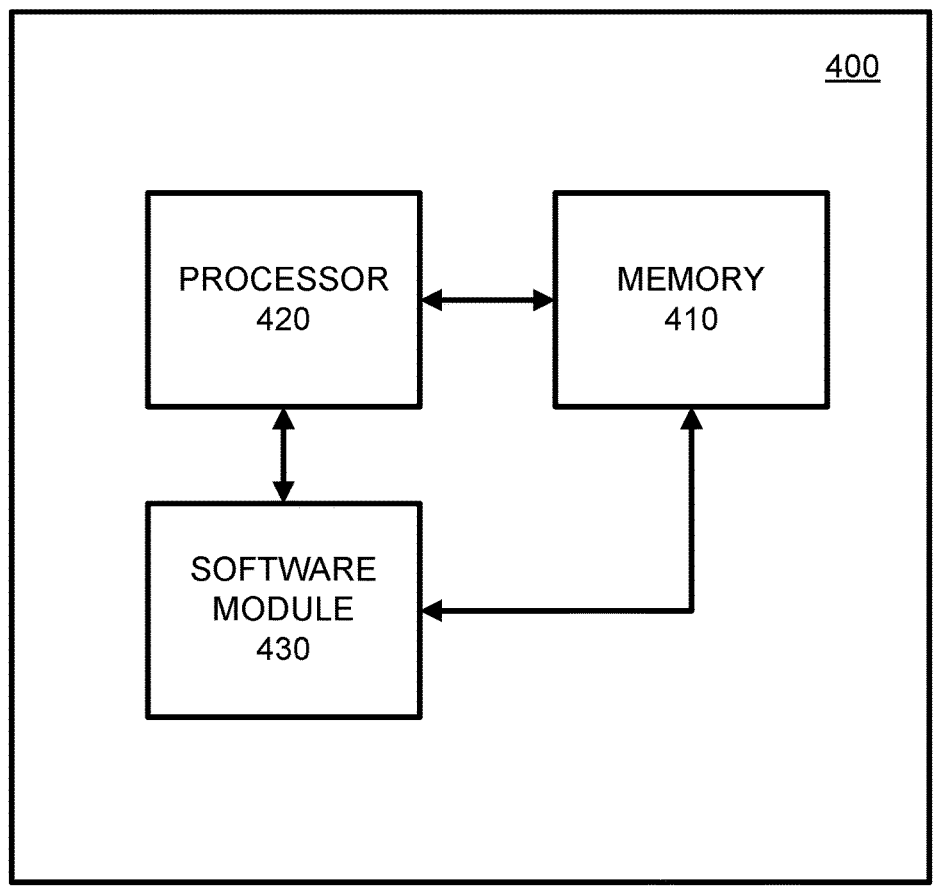
FIG. 4 illustrates an example network entity configured to support one or more of the example embodiments.

As illustrated in FIG. 4, a memory 410 and a processor 420 may be discrete components of a network entity 400 that are used to execute an application or set of operations as described herein. The application may be coded in software in a computer language understood by the processor 420, and stored in a computer readable medium, such as, a memory 410. The computer readable medium may be a non-transitory computer readable medium that includes tangible hardware components, such as memory, that can store software. Furthermore, a software module 430 may be another discrete entity that is part of the network entity 400, and which contains software instructions that may be executed by the processor 420 to effectuate one or more of the functions described herein. In addition to the above noted components of the network entity 400, the network entity 400 may also have a transmitter and receiver pair configured to receive and transmit communication signals (not shown).

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   receiving results from a network of nodes, by a submission node, the results created after execution of a test package by the network of nodes to perform a test associated with an application; and
   updating a blockchain with the results, by the submission node.

2. The method of claim 1, further comprising:
   creating, by the submission node, a contract comprising test information used to perform the test;
   including the contract and a request in the test package, by the submission node; and
   providing the test package to the network of nodes, by the submission node.

3. The method of claim 2, wherein the contract comprises one or more of a reward for performing the test, a number of test cycles, an amount of central processing unit utilization, an amount of memory utilization, and an amount of time.

4. The method of claim 1, wherein the test package comprises an image container.

5. The method of claim 1, wherein
   the submission node comprises a distributed peer proxy node server configured to distribute the test package to the network of nodes, and
   the network of nodes comprises a plurality of distributed peer proxy node client devices.

6. The method of claim 1, further comprising:
   comparing the received results to known results associated with the application, by the submission node; and
   creating an alert, by the submission node, when the results are different from the known results.

7. The method of claim 1, further comprising:
   broadcasting the results, by the submission node, to one or more client devices in the network.

8. An apparatus, comprising:
   a receiver configured to receive results from a network of nodes, the results created after execution of a test package by the network of nodes to perform a test associated with an application; and
   a processor configured to update a blockchain with the results.

9. The apparatus of claim 8, wherein the processor is further configured to:
   create a contract comprising test information used to perform the test;
   include the contract and a request in the test package; and
   provide the test package to the network of nodes.

10. The apparatus of claim 9, wherein the contract comprises one or more of a reward for performing the test, a number of test cycles, an amount of central processing unit utilization, an amount of memory utilization, and an amount of time.

11. The apparatus of claim 8, wherein the test package comprises an image container.

12. The apparatus of claim 8, wherein
    the apparatus comprises a distributed peer proxy node server configured to distribute the test package to the network of nodes, and
    the network of nodes comprises a plurality of distributed peer proxy node client devices.

13. The apparatus of claim 8, wherein the processor is further configured to:
    compare the received results to known results associated with the application; and
    create an alert when the results are different from the known results.

14. The apparatus of claim 8, further comprising:
    a transmitter configured to broadcast the results to one or more client devices in the network.

15. A non-transitory computer readable storage medium storing instructions that, when executed, cause a processor to perform:
    receiving results from a network of nodes, the results created after execution of a test package by the network of nodes to perform a test associated with an application; and
    updating a blockchain with the results.

16. The non-transitory computer readable storage medium of claim 15, wherein the instructions are further configured to cause the processor to perform:
    creating a contract comprising test information used to perform the test;
    including the contract and a request in the test package; and
    providing the test package to the network of nodes.

17. The non-transitory computer readable storage medium of claim 16, wherein the contract comprises one or more of a reward for performing the test, a number of test cycles, an amount of central processing unit utilization, an amount of memory utilization, and an amount of time.

18. The non-transitory computer readable storage medium of claim 15, wherein the test package comprises an image container.

19. The non-transitory computer readable storage medium of claim 15, wherein
    the test package is distributed by a distributed peer proxy node server, and
    the network of nodes comprises a plurality of distributed peer proxy node client devices.

20. The non-transitory computer readable storage medium of claim 15, wherein the instructions are further configured to cause the processor to perform at least one of:
    comparing the received results to known results associated with the application;
    creating an alert when the results are different from the known results; and
    broadcasting the results to one or more client devices in the network.

* * * * *